Jan. 29, 1957 J. C. ABBEY 2,779,608
COMBINED GATE VALVE AND COUPLING
Filed May 24, 1952 2 Sheets-Sheet 1
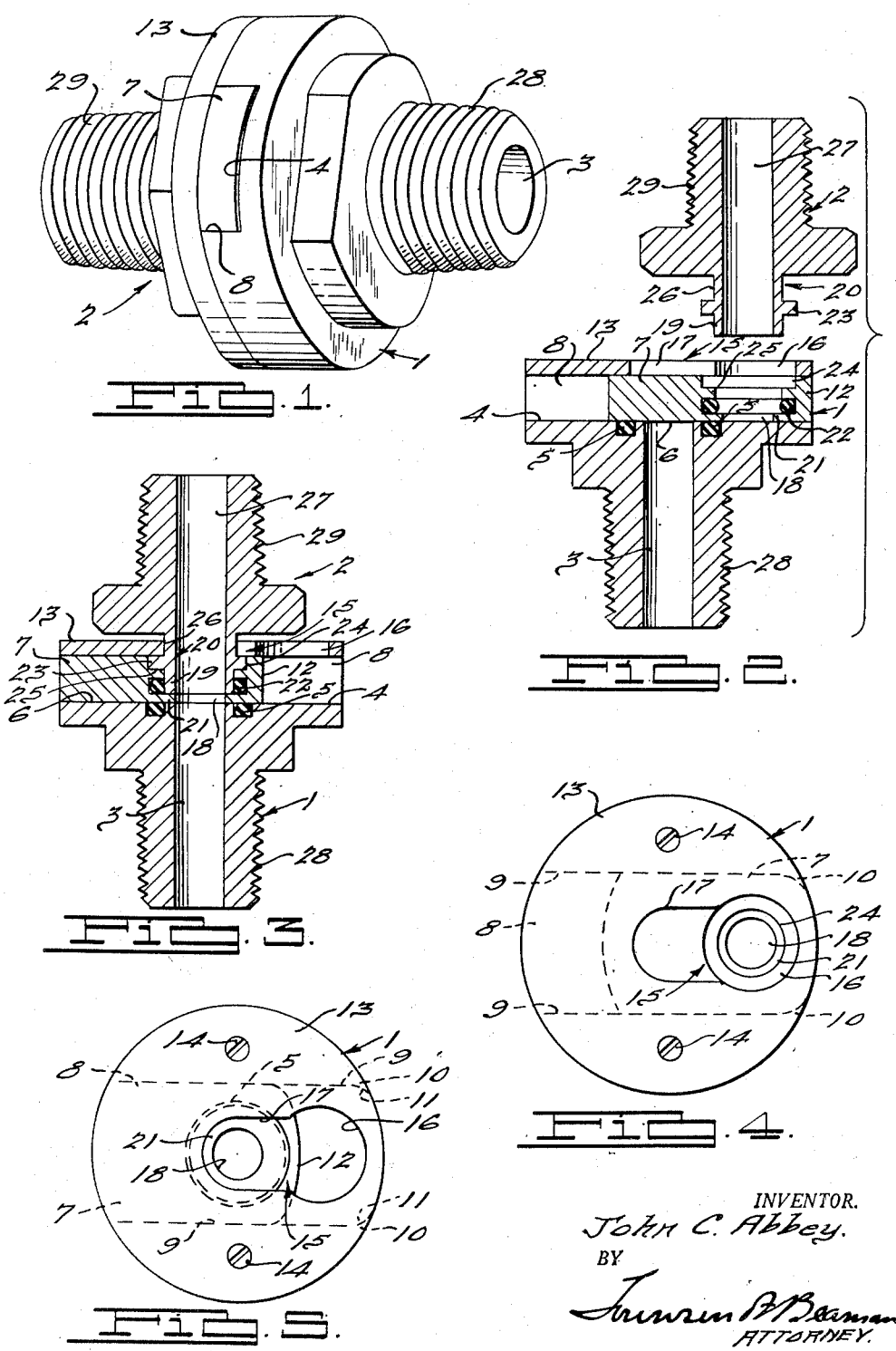
INVENTOR.
John C. Abbey.
BY
ATTORNEY.

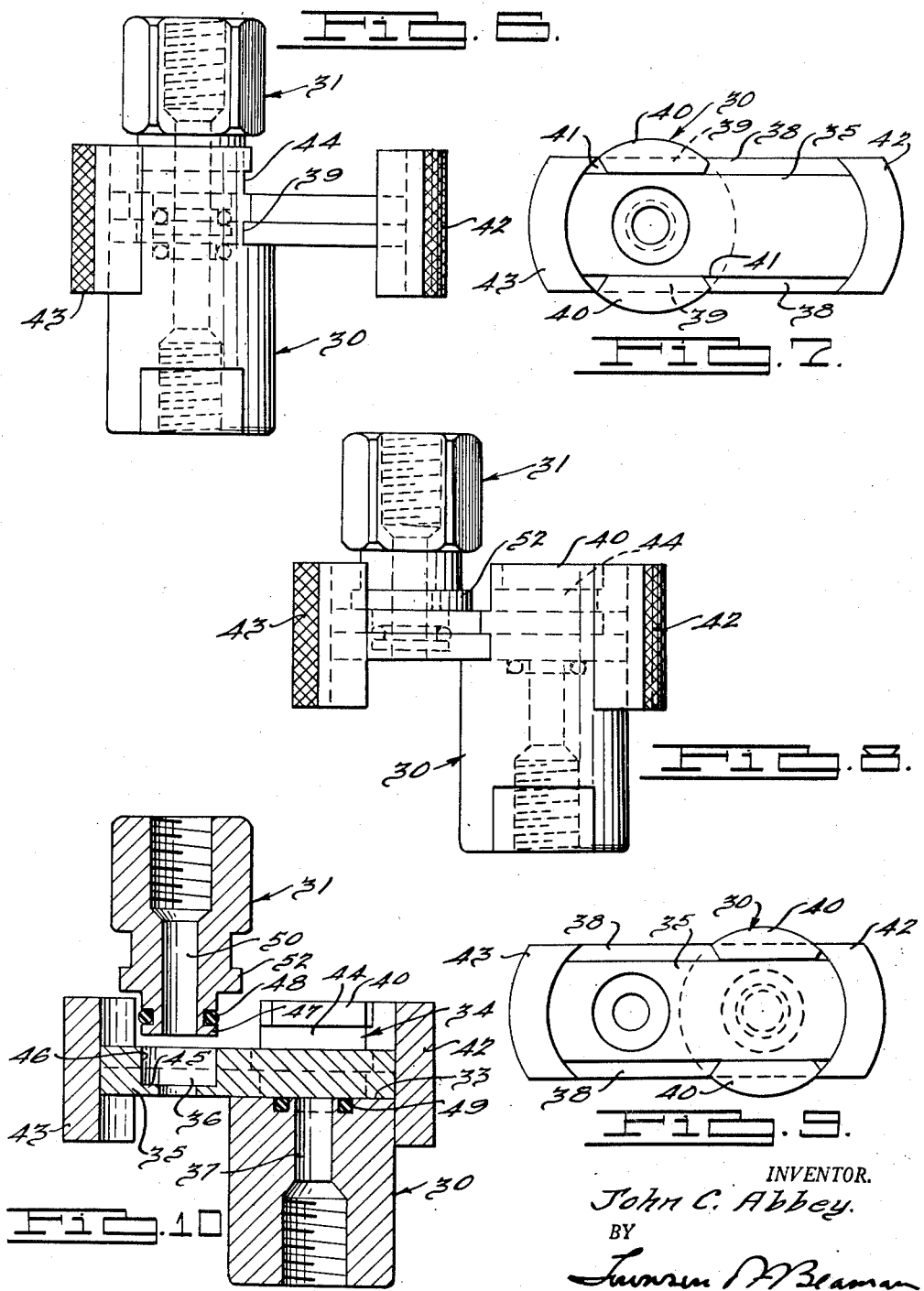

United States Patent Office 2,779,608
Patented Jan. 29, 1957

2,779,608
COMBINED GATE VALVE AND COUPLING

John C. Abbey, Parma, Mich., assignor to Aeroquip Corporation, Jackson, Mich., a corporation of Michigan Application May 24, 1952, Serial No. 289,861

1 Claim. (Cl. 284—18)

This invention relates to fluid conductor assemblies of the kind which comprise separable parts capable of being connected together in fluid flow transfer relationship and which incorporate valve means for interrupting the flow upon the parts being disconnected. In particular, the invention relates to fluid conductor assemblies of the above kind which incorporate a slidable gate valve for controlling the fluid flow and which are applicable to the control of fluid from a supply source to a pneumatic or fluid actuatable tool or the like.

It is an object of the present invention to provide a fluid conductor assembly in which the connection and disconnection of the fluid conductor parts and the control of the fluid flow with respect thereto is capable of being effected in a simple, rapid and efficient manner.

It is also an object of the present invention to provide a combined gate valve and fluid conductor coupling assembly with which the connecting and disconnecting operations, and the control of the fluid flow, is capable of being performed in an efficient and advantageous manner.

Further objects and advantages of the invention, residing in the construction, arrangement and combination of parts, will become apparent from a consideration of the following description of two practical forms of the invention, by way of example, with reference to the accompanying drawings, in which:

Fig. 1 is a perspective view of one form of the invention, with the parts in coupled condition, in which the gate valve is in open position, Fig. 2 is a vertical section of the coupling-gate valve assembly as seen in Fig. 1, but with the parts shown separated and positioned for coupling together and the gate valve in closed position.

Fig. 3 is a similar view to Fig. 2 but with the parts shown coupled together and the gate valve in open position, Fig. 4 is a plan view of the lower coupling part as seen in Fig. 2, Fig. 5 is a plan view of the lower coupling part as seen in Fig. 3, Fig. 6 is a side elevation of a second form of the invention, shown in the coupled and valve open position, Fig. 7 is a plan view of the lower coupling part as seen in Fig. 6, the upper coupling part being removed and the gate valve having been moved to the coupled and open position with the upper coupling part removed, Fig. 8 is a side elevation, similar to Fig. 6, but showing the parts positioned for uncoupling, Fig. 9 is a plan view of the lower coupling part as seen in Fig. 8, with the upper coupling part removed, and Fig. 10 is a vertical section of this combined coupling and gate valve assembly with the parts positioned for coupling together and opening of the gate valve.

Referring to the drawings, and first to Figs. 1 to 5, there is shown a body structure, indicated generally at 1, and a fluid conductor, indicated generally at 2.

The body structure is of circular form, as seen clearly in Fig. 1, and has a fluid flow passage 3 open to an inner surface 4, which surface is fitted with an O sealing ring in abounding relationship to this end of the flow passage 3, and sealing with respect to the surface 6 of a gate valve 7 slidable in a diametral slideway 8 formed in the body part 1 and containing said surface 4.

The gate valve 7 is of elongated rectangular shape as seen in Fig. 5, as also is the slideway 8, the side walls 9 of which, at one end, are formed with inwardly directed portions 10 presenting curved surfaces 11 forming stops for engagement by the corresponding arcuate end 12 of the gate valve, which end lies flush with the circular edge of the body part 1 when the gate valve is in the closed position, with its said end 12 against the stop surfaces 11.

The gate valve 7 is retained for sliding movement in the slideway 8 by a cover plate 13 of the body part 1, shown assembled upon the body part by screws 14. This cover plate is formed with a key-hole slot 15 defining an end circular portion 16 and an elongated rectangular portion 17 closed at one end by a semi-circular end and open at its opposite end to the circular portion 16.

The gate valve 7 is formed with an orifice 18 of a diameter which provides a sliding fit for the end portion 19 of a hollow pin projection 20 of the separate fluid conductor 2, which conductor part is capable of being fitted onto the gate valve 7 for coupling onto the body structure 1.

The gate valve orifice 18 has an inturned flange 21 at its inner end, which presents a seat to the end of the pin portion 19. The wall of the orifice is fitted with an O sealing ring 22 for maintaining a fluid seal with respect to this pin portion when fitted into the orifice.

The pin portion 19 is defined by an outwardly directed annular flange 23 which is capable of being slidably received within an enlarged orifice portion 24, which provides an annular seat 25 for this flange.

The elongated slot portion 17 is of a width corresponding to the diameter of the reduced pin portion 26.

The conductor part 2 provides a fluid passage 27, which extends through the pin portions 19 and 26 and is capable of being registered with the fluid passage 3 via the gate valve orifice 18, with the gate valve is moved into the open position, upon the parts 1 and 2 being coupled together.

The body parts 1 and 2 are formed with externally screw-threaded bosses 28 and 29, respectively, or may be otherwise formed for connection with their respective fluid conductor extensions (not shown). The body part 1, for instance, may be fitted by its boss 28 to a pneumatic cylinder or supply line, whereas the part 2 may be fitted by its boss 29 to a length of hose connected to a pneumatic tool.

In the uncoupled condition of the parts, as seen in Figs. 2 and 4, the gate valve 7 is located with its end 12 against the stops 11. In this position, the fluid passage 3 is closed by the gate valve but the gate valve orifice 18 is in register with the circular end 16 of the key-hole slot 15. With the parts so positioned, to couple the parts 1 and 2 together and open up the fluid passages 3 and 27 to the transfer of fluid therethrough, it is merely necessary to insert the pin portion 19 into the orifice 18 to locate the pin end against the seat 21 and the flange 23 against the seat 25. In this condition, the pin portion of the part 2 is sealed within the orifice by the sealing ring 22 and the part 2 is ready to be carried along upon the gate valve for coupling onto the body part 1. To do this, the part 2 is slid to the left, as seen in Fig. 2, relatively to the body part 1, into the position seen in Fig. 3. Such sliding movement causes the pin portion 26 to be slid along the elongated slot portion 17, and the flange 23 to be then locked behind plate 13, thereby preventing axial separation of the parts 1 and 2. At the same time the orifice 18 is brought into register with the fluid passage 3 so that, with the fluid passage 27 already registered with the fluid passage 27, the two passages are thus brought into fluid flow register with one another via the orifice 18. The gate valve 7, therefore, serves the dual function of both coupling the parts 1 and 2 together and opening up the passages therein to the flow of fluid therethrough.

To uncouple or separate the parts 1 and 2, it is merely necessary to slide the parts relatively to one another in the opposite direction from the coupled position, as seen in Fig. 3, to the uncoupling position as seen in Fig. 2. As the gate valve 7 is slid back to bring the flange 23 into register with the enlarged end 16 of the key-hole slot 15, the gate valve automatically closes the fluid passage 3 and thus cuts off the flow of fluid through this passage. With the parts as seen in Fig. 2, the parts 1 and 2 are free to be separated axially.

Referring now to Figs. 6 to 10, the coupling and gate valve assembly illustrated therein has the same general construction and function as that according to the previously described figures but differs therefrom as to its overall shape and in details of construction.

In Figs. 6 to 10, there is shown a body structure 30 and a conductor 31. The body 30 has an axial fluid flow passage 32 open to a surface 33 forming part of a transversely extending guideway, indicated generally at 34, in which guideway the gate valve 35 is mounted for sliding movement to position an orifice 36 therein either in register with the axial passage 37 in the body part 30, as seen in Fig. 3, or out of register therewith, as seen in Fig. 2.

The gate valve 35 is of elongated rectangular shape, as seen clearly in Figs. 7 and 9, and has its longitudinal edges formed with flanges 38 slidably engaged in grooves 39 in the body part, which part has an end socket defined by diametrically opposite substantially arcuate section portions 40 containing said grooves 39 and defining opposed side gaps 41 which are alternately closed by arcuate shape finger actuator portions 42, 43 at the opposite ends of the gate valve. These body portions 40 are also formed with transversely extending guideway grooves 44.

The gate valve orifice 36 is formed with an internal annular seat 45 and provides a socket portion 46 into which a pin portion 47 on the conductor 31 is capable of being fitted, this pin portion containing a sealing ring 48 for sealing with respect to the socket and the said surface 33 having a sealing ring 49 in abounding relation to the passage 37 and sealing with respect to the gate valve.

The conductor has the axial fluid passage 50 and is also formed with a flange 52 for seating over the upper end of the socket 46.

With the parts as seen in Fig. 10, the gate valve 35 closes the passage 37 and the gate valve is positioned to receive the conductor 31, which is free to be moved to engage its pin portion 47 in the socket 46 and thus register its passage 50 with the valve orifice 36. With the parts so positioned, the flange 52 lies in the path of the grooves 44. Upon sliding the gate valve to the right, from the position seen in Fig. 8, the opposite portions of this flange engage in the grooves 44 and are held therein by the presence of the actuator portion 43 as this is brought to rest against the corresponding side of the body part 30 and closes the gap 41 on this side. With the parts as positioned in Figs. 6 and 7, the passages 37 and 50 are in register via the orifice 36 and the parts 30 and 31 are secured against axial disconnection. To disconnect the parts it is merely necessary to exert pressure against the actuator portion 42 to push the gate valve to the left from the position as seen in Figs. 6 and 7. Such movement removes the flange 52 from engagement with the grooves 44 and frees the conductor to be removed from the gate valve when the parts are positioned as seen in Figs. 8 and 9.

Having thus described my invention, what I claim as novel and wish to secure by Letters Patent is as follows:

A separable coupling for conducting high pressure fluid comprising in combination, body structure having a fluid flow passage and a rectilinear guideway extending transversely with respect to the longitudinal axis of said passage, said body structure having diametrically opposed portions adjacent said guideway defining locating stop portions, said passage being open at one end to said guideway, a gate valve slidably mounted on said guideway for movement to open or close said passage end, said gate valve having an orifice registrable with said passage end in one extreme position of the gate valve and having an imperforate portion for closing said passage end in another extreme position of said gate valve, said gate valve having end wall portions in off-set relation to said guideway and disposed on the outside of said locating stop portions and contactable with said stop portions in the extreme position of movement of said gate valve, a sealing ring on said body structure, said sealing ring encircling said passage end to maintain a fluid-tight seal between said passage end and said gate valve, a separate conductor for said fluid, said conductor having a passage alignable with said first mentioned passage and having an end boss portion slidably insertable within the said gate valve orifice when the gate valve is slid to its one extreme position in which the imperforate portion of the gate valve closes the said end of said first passage, said gate valve orifice having an annular seat for abutment by said boss, said boss portion including one end of the passage of said separate conductor, a second sealing ring engageable between said boss portion and said orifice to effect a fluid-tight seal therebetween when said boss portion is abutted against said seat in said orifice so that the said separate conductor is applied to the gate valve for translational movement therewith, and means on said separate conductor cooperative with said guideway to hold the conductor captive upon the said body structure when said gate valve, with the said conductor applied thereto, is slid to place its orifice in register with said passage end of the said body structure.

References Cited in the file of this patent

UNITED STATES PATENTS

| | | |
|---|---|---|
| 2,403,620 | Snyder et al. | July 9, 1946 |
| 2,460,137 | Lindeman | Jan. 25, 1949 |
| 2,619,367 | Hanson | Nov. 25, 1952 |
| 2,666,656 | Bruning | Jan. 19, 1954 |
| 2,675,829 | Livers | Apr. 20, 1954 |

FOREIGN PATENTS

| | | |
|---|---|---|
| 224,205 | Great Britain | Feb. 26, 1925 |
| 232,056 | Great Britain | Apr. 16, 1925 |